UNITED STATES PATENT OFFICE.

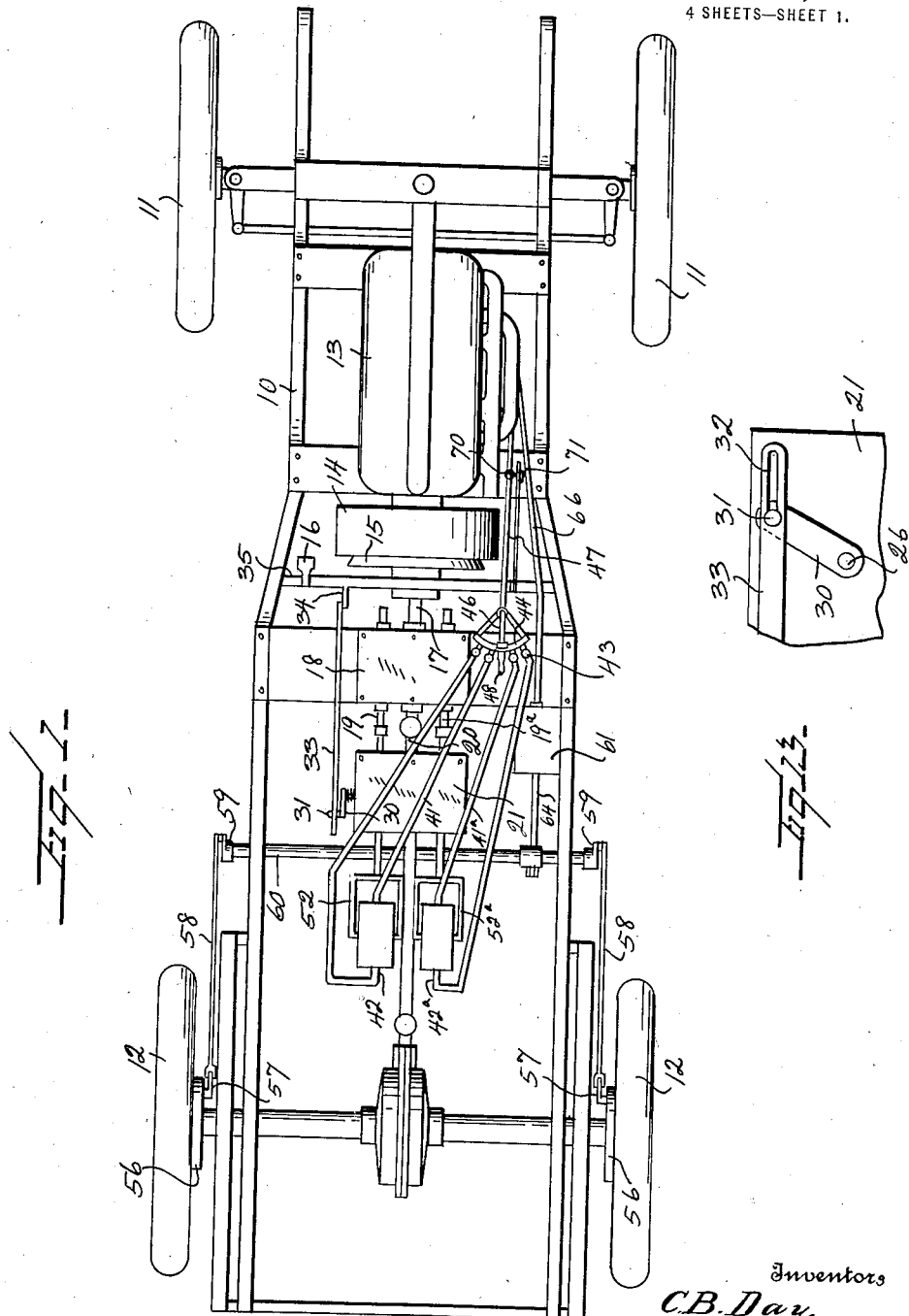

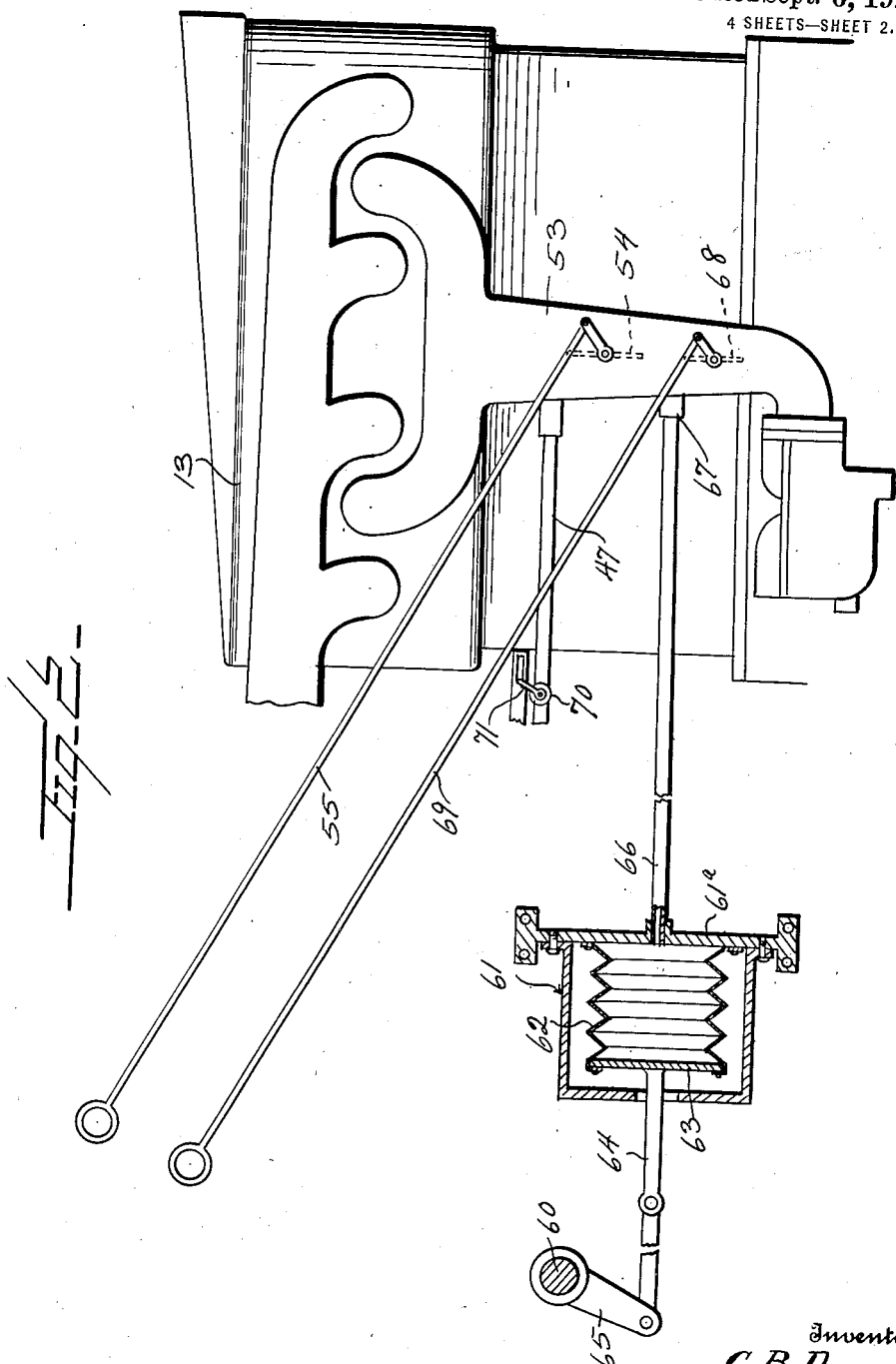

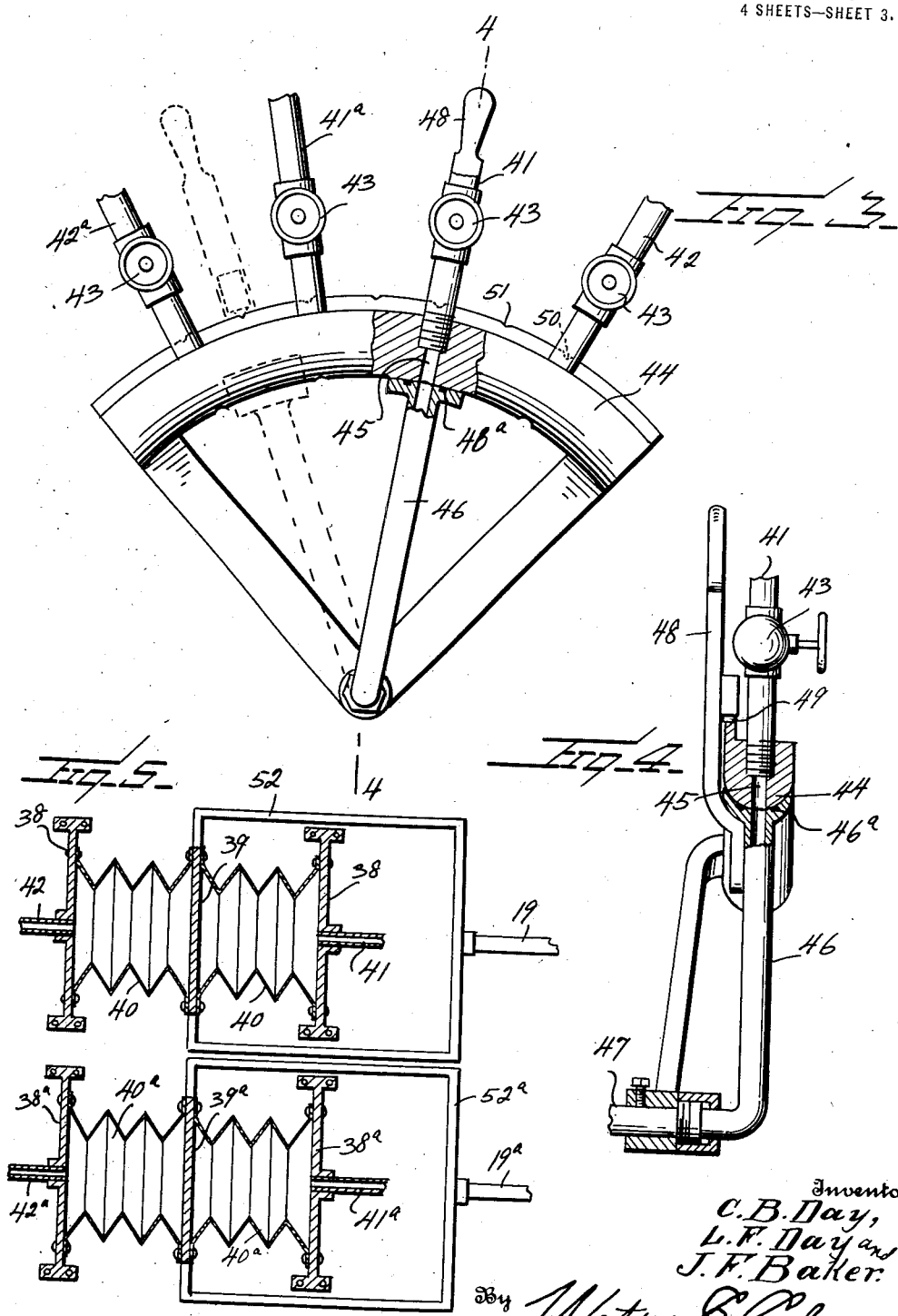

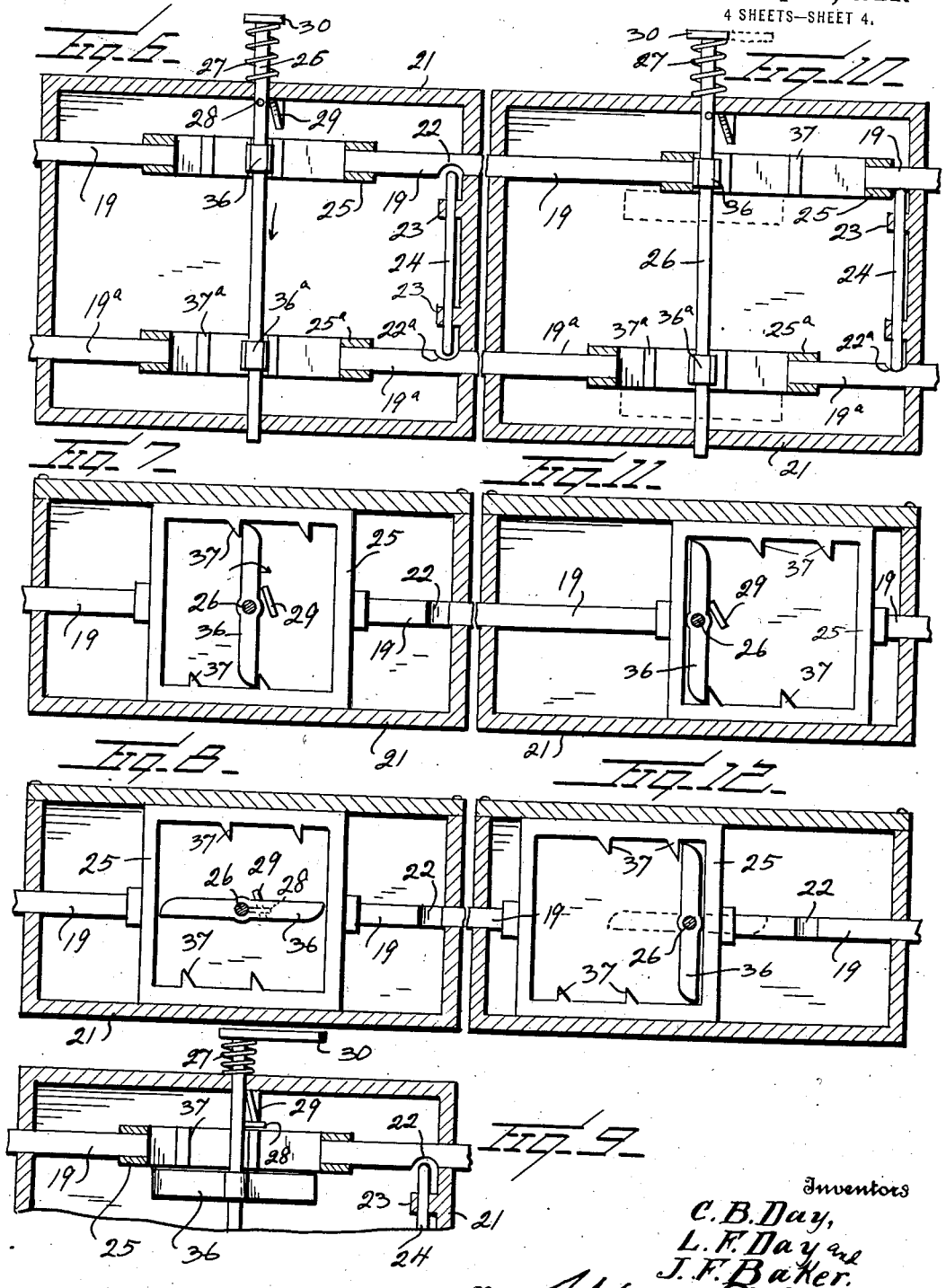

CHARLES B. DAY, LUTHER F. DAY, AND JESSE FORREST BAKER, OF LAMAR, COLORADO.

CONTROL APPARATUS FOR TRANSMISSIONS AND BRAKES OF AUTOMOBILES.

1,389,816. Specification of Letters Patent. Patented Sept. 6, 1921.

Application filed December 18, 1920. Serial No. 431,719.

*To all whom it may concern:*

Be it known that we, CHARLES B. DAY, LUTHER F. DAY, and JESSE FORREST BAKER, citizens of the United States, residing at Lamar, in the county of Prowers and State of Colorado, have invented certain new and useful Improvements in Control Apparatus for the Transmissions and Brakes of Automobiles, of which the following is a specification, reference being had to the accompanying drawings.

This invention relates to control apparatus for the transmission and brakes of automobiles.

An important object of the invention is to provide means whereby the shifting of the brakes and transmission gearing of an automobile may be accomplished through the medium of the suction created in the intake manifold of the engine during the operation of the same.

A further object of the invention is to provide in the intake manifold of an engine a plurality of throttle valves in order that the suction created in the manifold may be directed selectively to either the transmission or brakes as desired.

A still further object of the invention is to provide in combination with a transmission means whereby the operating shafts of the transmission are locked against movement when the clutch is engaged and are released for movement upon disengagement of the clutch, said release being made subsequently to the disengagement of the clutch.

A still further object of the invention is to provide in combination with the transmission and clutch of an automobile means for locking the operating shafts of the transmission against movement when the clutch is in engaged position, which means likewise serves to return the gears of the transmission to the neutral position upon a further movement of the clutch pedal subsequently to the release of the clutch.

A still further object of the invention is to provide in combination with a transmission control of the type above set forth means whereby the controlling shafts of the transmission are shifted by the suction created in the intake manifold of the engine during its operation.

A still further object is to provide an improved selective control for suction operated controls for transmissions.

Other objects and advantages of the invention will become apparent throughout the course of the following description:

In the accompanying drawings, wherein for the purpose of illustration is shown a preferred embodiment of our invention and wherein like reference characters designate like parts throughout:

Figure 1 is a diagrammatic view of an automobile chassis and drive embodying our invention;

Fig. 2 is a side elevation showing the brake control and the arrangement of throttle valves in the intake manifold of the engine;

Fig. 3 is a plan view, partly in section, of the selective mechanism employed for directing the suction to various points in the transmission controlling apparatus;

Fig. 4 is a section taken on the line 4—4 of Fig. 3;

Fig. 5 is a sectional view, partially in elevation and partially diagrammatic, showing the suction operated shifting mechanism for the transmission control shafts;

Figs. 6 to 12, inclusive, are sectional views illustrating the operation and construction of the means for locking the transmission control shafts in adjusted position and for returning the same to neutral position, and Fig. 13 is a fragmentary detail view showing the connection of the clutch pedal link with the control shaft of the locking mechanism.

Referring now more particularly to the drawings, the numeral 10 indicates the body frame of an automobile provided with the usual supporting and steering wheels 11 and supporting and driving wheels 12. Upon the frame forwardly is mounted the usual engine 13 from the crank shaft of which is driven a clutch organization 14 embodying a shaft clutch element 15 adapted when moved in one direction through medium of the clutch pedal 16 to connect the crank shaft of the engine and the drive shaft of the vehicle, as indicated at 17. This drive shaft as is usual extends within a transmission casing 18 embodying the usual shiftable gearing (not shown) operated through medium of shifting rods 19 and 19ᵃ. By shifting these rods the shaft 17 may be operably connected with the propeller shaft 20 at a desired ratio, as is usual.

The rear ends of the rods 19ᵃ are slidably directed through a casing 21. Each of the rods 19 and 19ᵃ is adapted to be moved to three distinct positions, neutral, forward and rear. Within the casing the rods 19 and 19ᵃ are provided with opposed notches 22 and 22ᵃ which are alined when the rods 19 and 19ᵃ are in the neutral position. Slidably mounted with guides 23 formed within the casing 21 is the locking member 24 which is of a length greater than the distance intermediate the rods and slightly less than the distance intermediate the rods plus the depth of one of the notches 22 or 22ᵃ. The notches 22 and 22ᵃ have their sides beveled so that if one of the rods 19 or 19ᵃ is shifted longitudinally, the member 24 is moved over into engagement with the notch of the other rod and prevents movement thereof from the neutral position, as shown in Fig. 10. It will thus be seen that it is impossible with our mechanism to simultaneously engage two sets of gearing.

The rods 19 and 19ᵃ within the casing 21 each embody a substantially vertically disposed rectangular yoke, as indicated at 25 and 25ᵃ. A shaft 26 extends transversely of the casing 21 and is slidably and rotatably mounted in the walls thereof, the shaft being held normally in one position with regard to longitudinal movement through medium of a spring 27 disposed exteriorly of the casing and surrounding the shaft 26. Within the casing a pin 28 limits the movement of the shaft 26 under the influence of the spring 27. On the casing wall of the casing 21 adjacent the shaft 26 is mounted a cam 29 with which the pin 28 engages when the shaft 26 is rotated.

The outer end of the shaft 26 is provided with an arm 30 bearing at its free end a pin 31, which pin is slidably directed through a slot 32 formed in the rear end of a link 33. The forward end of the link 33 is connected to an arm 34 formed on the clutch control shaft 35 which is operated by the clutch pedal 16.

The slotted connection of the link 33 to the arm 30 of the shaft 26 permits sufficient movement of the clutch pedal 16 to release the clutch without affecting the shaft 26. A further movement of the clutch pedal 16 will, however, cause rotation of the shaft 26 and the pin 28 engaging the cam 29 will cause the shaft 26 to be shifted transversely of the casing 21 in the direction of the arrow shown in Fig. 6, rotation of the shaft being in the direction shown by the arrow of Fig. 7. The shaft 26 has mounted thereon within the casing and alining with the yokes 25 and 25ᵃ operating members 36 and 36ᵃ, which operating members are secured to the shaft for rotation and longitudinal shifting therewith. These members are normally disposed within the yokes and remain within the yokes until the shaft 26 has completed a one quarter turn.

By an inspection of Fig. 12 it will be seen that with the yoke 25, or 25ᵃ as the case may be, in the position shown, if the clutch pedal is moved a requisite distance to cause the oscillation of the shaft 26, the yoke 25 will be shifted longitudinally by the member 36 until it assumes the neutral position. Further movement of the shaft 26 removes the members 36 and 36ᵃ from the yokes completely as suggested by the dotted lines in Fig. 10 and shown in solid lines in Fig. 9. At this time either of the shafts 19 or 19ᵃ may be shifted.

Assuming the yoke 25 to be in the normal or neutral position and the shaft 26 to have been rotated so as to place the members 36 and 36ᵃ in the position shown in Fig. 9, if the yoke 25 is shifted to the position shown in Fig. 12 and the clutch pedal released to reengage the portions of the clutch, the operating member 36 will engage against the face of the yoke 25 and rotate thereon until it is properly alined to enter the yoke at which time it will enter the yoke by reason of the spring 27. Shifting of the yoke when the operating members are in the normal or vertically disposed position is prevented by means of lugs 37 formed on the inner face of the yokes, one of these lugs engaging with the operating member when the shaft is out of neutral position and two of these lugs engaging the ends of the members 36 when it is in the neutral position, thus preventing any movement of the yoke 25 or 25ᵃ as the case may be when the member 36 or 36ᵃ is vertically disposed. It will be understood that the engagement of the member 36 or 36ᵃ with the yoke, when the yoke is shifted so that the corresponding shaft 19 or 19ᵃ has moved the gears to engaged position, will effectually prevent shifting in one direction so that but a single lug is necessary.

38 and 38ᵃ designate spaced pairs of stationary heads alined with the shafts 19 and 19ᵃ, respectively. Arranged intermediate each pair of stationary heads 38 and 38ᵃ are movable heads 39 and 39ᵃ, which movable heads are connected to each of the stationary heads of its respective pair by a flexible bellows-like diaphragm 40 or 40ᵃ as the case may be. The forward stationary heads 38 and 38ᵃ have connected therewith conduits 41 and 41ᵃ and the rear stationary heads have connected thereto conduits 42 and 42ᵃ, each of which conduits has arranged therein at a point convenient for operation a valve 43 by means of which the passage of fluid through the conduit may be adjustably controlled. Each of these conduits communicates at its opposite end with a bore 45 formed in an arcuate control member 44.

A conduit 46 is mounted for oscillation with the arcuate center of the control member 44 as an axis and has its outer or free end abutting the inner face of the arcuate control member 44 and forming a fluid-tight joint therewith, as indicated at 46ª. This oscillatory conduit 46 connects with a conduit 47, the purpose of which will hereinafter appear. The arcuate control member 44 and its associated mechanism may be mounted at any desired point where it will be convenient to the driver of the vehicle.

The oscillatory conduit 46 has secured thereto an outwardly extending operating handle member 48 embodying a spring dog 49 adapted to coact with shifting notches 50 and neutral notches 51 formed in the outer surface of the arcuate control member 44. When the operating handle member 48 has the dog thereof engaged with one of the notches 50, the conduit 46 has the bore thereof in communication with one of the radial bores 45 of the control member 44 and, consequently, is in communication with the conduit communicating with the bore. In Figs. 3 and 4 we have illustrated the handle member as having the dog thereof engaged with the notch 50 corresponding to the conduit 41 which communicates with the forward head 38. When, however, the dog 49 is in engagement with one of the neutral notches 51, the conduit 46 is out of engagement with all of the bores 45 and the conduits 41, 41ª, 42 and 42ª are in communication with the atmosphere through these bores 45.

The movable heads 39 and 39ª are connected with their respective rods 19 and 19ª through medium of yokes 52 and 52ª straddling the forward heads 38 and 38ª and secured to the rods. The numeral 53 designates the intake manifold of the engine 13, with which intake manifold the conduit 47 communicates. Within the manifold 53, beneath the point of communication of the conduit 47 with the manifold, a butterfly valve 54 is arranged which is provided with the usual operating mechanism, as designated diagrammatically by the bar 55.

It will be seen that by shifting the throttle valve 54 the suction of the intake manifold is concentrated upon the conduit 47 and, accordingly, acts through the conduit 46. If the conduit 46 is alined with any of the bores 45, the suction is communicated to the corresponding flexible diaphragm and the corresponding movable head is shifted toward one of the stationary heads. When the conduit 46 is in the position illustrated in Figs. 3 and 4 the suction acts through the conduit 41 and head 38 of the diaphragm 40 connecting the movable head 39 and head 38 causing the movable head 39 to move forwardly and accordingly to shift the rod 19 forwardly, shifting the gears within the transmission casing 18. If, however, the suction is in communication with the conduit 42 the head 39 moves rearwardly, shifting the rod in this direction. It will be obvious that by manipulating the control handle member 48, the suction may be placed in communication with any of the diaphragms 40 or 40ª and the movable heads 39 and 39ª shifted in either direction as may be desired.

The numeral 56 designates the brake drums of the vehicle with which are associated the usual expanding levers 57 which are connected by links 58 with the arm 59 of the arcuate shaft 60. 61 designates a stationary casing directed longitudinally of the vehicle and one end of which, as designated at 61ª, forms a stationary head which is connected by a flexible bellows-like diaphragm 62 to a movable head 63 disposed within the casing. To this movable head is secured a piston rod 64 which is directed through an opening formed in the casing and which is operably connected with a further arm 65 formed upon or secured to the shaft 60. It will be obvious that movement of the head 63 will cause corresponding movement of the expanding lever 57, movement of the head 63 in a direction toward the head 61ª causing the brakes to be expanded and grip the driving wheels 12, preventing rotation thereof. A conduit 66 has its end directed through the head 61ª and its opposite end communicating with the intake manifold 53 at a point below the throttle valve 54, as indicated at 67. Below the entrance point of the conduit 66, a second throttle valve 68 is disposed within the manifold and is provided with an operating connection diagrammatically illustrated by the rod 69. It will be obvious that the conduits 47 and 66 being disposed above the throttle valve 68 in the manifold 53, the closing of the throttle valve 68 would cause simultaneous action of the suction through these conduits and we, accordingly, provide in the conduit 47 a valve 70 which is operably connected with the operating pedal of the clutch by a slotted link 71. This link connection has the slot thereof of sufficient length that the valve 70 is not actuated during normal operation of the clutch. That is to say, if the clutch is simply disengaged, as for example, when the machine is turning a corner, the valve 71 is not open. When, however, the clutch pedal 16 is shifted to the position in which it returns the operating rods 19 and 19ª to the normal or neutral position, the valve 70 is open and, accordingly, vacuum may be applied through the conduit 47.

In the operation of our device, when it is desired to shift the gears, the pedal 16 is first fully depressed to open the conduit 47 to place the rods 19 and 19ª in the normal or neutral position and to disconnect the clutch. The conduit 46 is then connected with the desired conduit of the series 41, 42, 41ᵃ and 42ᵃ and the operating mechanism 55 manipulated to close or partially close the throttle valve 54 when the suction created within the engine will be directed through the conduit 47, thence through the selected conduit to the desired diaphragm and the corresponding head 39 or 39ᵃ shifted. The pedal 16 is then released reëngaging the clutch, closing the conduit 47 and locking the rods 19 and 19ᵃ in adjusted positions. The conduit 47 may be left in communication with the selected conduit of the series or may be shifted through its branch 46 to a neutral position. If it is desired to apply the brake, the control mechanism designated as 69 is manipulated to close or partially close the throttle valve, at which time the suction is directed through the conduit 66 causing the movable heads 63 to shift and apply the brakes. As is well known, when applying the brakes the clutch is usually disengaged to prevent undue strain upon the power unit. As, however, the connection between the clutch pedal shaft 35 and the valve 70 does not become active until the clutch pedal is moved past the disengagement point of the clutch, the conduit 47 remains closed and the suction is not transmitted therethrough.

From the foregoing it will be obvious that we have provided a brake and transmission control apparatus for power vehicles which is simple in construction and which is efficient. It will likewise be obvious that we have provided a novel means for selectively directing the suction of the intake manifold of the engine to either the transmission control or brake apparatus as may be desired. As many changes in the shape, size and arrangement of the various parts hereinbefore set forth are obviously possible without materially departing from the spirit of our invention, we do not limit ourselves to the specific structure as hereinbefore set forth, except as so limited by the subjoined claims.

What we claim is:—

1. In combination with an internal combustion engine having an intake pipe, a transmission embodying operating rods, a brake applied to mechanism driven by the engine through said transmission, a member embodying portions shiftable under vacuum and connected with said operating rods, a second member embodying a portion shiftable under vacuum and connected with the brake, conduits connecting said members with the intake manifold, and means operating in the intake pipe for selectively directing the suction through either of said conduits.

2. The combination with an internal combustion engine embodying the usual intake manifold, of a plurality of suction operated elements, conduits connecting said elements with said intake manifold, said conduits engaging the manifold at vertically spaced points, a throttle valve arranged within said manifold intermediate the points of entrance of said conduits and a throttle valve disposed within said intake manifold beneath the point of entrance of the lowermost conduit.

3. In combination with an internal combustion engine having an intake pipe, a clutch, a transmission embodying operating rods, a brake applied to mechanism driven by the engine through said clutch and transmission, a member embodying portions shiftable under vacuum and connected with said operating rods, a second member embodying a portion shiftable under vacuum and connected with the brake, conduits connecting said members with the intake manifold, means for selectively directing the suction within the manifold through either of said conduits, an operating member for said clutch and means actuated in the operation of said operating member to disengage the section of the clutch and for returning said operating rods to neutral position.

4. The combination with a transmission embodying a shiftable operating rod, of a pair of spaced stationary heads, a shiftable head disposed intermediate said stationary heads and connected with said rod to shift the same, said shiftable head being movable toward either of said stationary heads upon creation of a vacuum between the stationary and shiftable heads, a source of suction and means for selectively connecting the spaces intermediate said stationary head and said shiftable head with the source of suction.

5. The combination with a transmission embodying a shiftable operating rod, of a pair of spaced stationary heads, a shiftable head disposed intermediate said stationary heads and connected with said rod to shift the same, a flexible bellows-like diaphragm connecting said shiftable head with each of said stationary heads, said shiftable head being movable toward either of said stationary heads upon creation of a vacuum between the stationary and shiftable heads, a source of suction and means for selectively connecting the spaces intermediate said stationary head and said shiftable head with the source of suction.

6. The combination with a power unit, a power shaft connectible with and disconnectible from the power unit, a member adapted when shifted in one direction to connect said unit and shaft and when shifted in the opposite direction to disconnect the unit and shaft, a transmission associated with said shaft and shifting rods for said transmission adapted to be shifted to neutral and adjusted positions, of a rotatably and longitudinally shiftably mounted shaft, means connecting said shaft and member whereby the shaft is rotated when the member is shifted, members secured to said shaft and corresponding in number and arrangement to said rods for locking said rods against movement in neutral and adjusted positions and means operated by the rotation of said shaft for shifting said locking members out of locking engagement with said shafts when the shaft is rotated in one direction.

7. The combination with a transmission and shifting rods for said transmission adapted to be shifted to neutral and adjustable positions, of a yoke secured to each of said rods, a shaft extending transversely through said yokes, members carried by said shaft corresponding in number and arrangement to said yokes, means carried by said yokes and coacting with said members for preventing longitudinal shifting of said rods, said shaft being adapted when rotated to return said rods to neutral position through engagement of said members with said yokes and to release said rods for movement and means for rotating said shaft.

8. The combination with a transmission and shifting rods for said transmission adapted to be shifted to neutral and adjusted positions, of a yoke secured to each of said rods, a shaft extending transversely to said yoke, members carried by said shaft corresponding in number and arrangement to said yokes, means carried by said yokes and coacting with said members for preventing longitudinal shifting of said rods, said shaft being adapted when rotated to return said rods to neutral position through engagement of said members with said yokes and means operated by the rotation of said shaft for shifting said shaft longitudinally to thereby free said rods for longitudinal shifting.

In testimony whereof we hereunto affix our signatures.

CHARLES B. DAY.
LUTHER F. DAY.
JESSE FORREST BAKER.